(12) United States Patent
McBride et al.

(10) Patent No.: US 11,390,160 B2
(45) Date of Patent: Jul. 19, 2022

(54) WHEEL DISCONNECT CLUTCH

(71) Applicant: FORD GLOBAL TECHNOLOGIES, LLC, Dearborn, MI (US)

(72) Inventors: Thomas Russell McBride, Livonia, MI (US); Norman Jerry Bird, Plymouth, MI (US); Megan Mackenzie Gould, Plymouth, MI (US); Diana Barbara Placha, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 17/116,283

(22) Filed: Dec. 9, 2020

(65) Prior Publication Data

US 2022/0176813 A1    Jun. 9, 2022

(51) Int. Cl.
  *F16D 11/14*  (2006.01)
  *B60K 17/35*  (2006.01)
  *F16D 43/02*  (2006.01)

(52) U.S. Cl.
  CPC .......... *B60K 17/3515* (2013.01); *F16D 11/14* (2013.01); *F16D 43/02* (2013.01)

(58) Field of Classification Search
  CPC ...... B60K 17/3515; F16D 11/14; F16D 43/02
  See application file for complete search history.

(56) References Cited

U.S. PATENT DOCUMENTS

| | | | |
|---|---|---|---|
| 9,784,321 B2 | 10/2017 | Pritchard | |
| 10,968,986 B1* | 4/2021 | Sung | F16H 63/3441 |
| 2012/0067689 A1 | 3/2012 | Eastman | |
| 2019/0331173 A1* | 10/2019 | Eschenburg | B60K 17/3515 |
| 2021/0024560 A1* | 1/2021 | Guo | C07F 3/06 |

* cited by examiner

*Primary Examiner* — David J Hlavka
(74) *Attorney, Agent, or Firm* — Vincent Mastrogiacomo; Brooks Kushman P.C.

(57) ABSTRACT

A wheel disconnect clutch includes a housing attachable to a knuckle and a clutch sleeve slidably supported for axial movement within the housing and having first teeth configured to couple with a wheel hub and second teeth configured to couple with a half shaft. The clutch sleeve is slidable between an engaged position in which the first teeth are coupled to the wheel hub and a disengaged position in which the first teeth are decoupled from the wheel hub. A drive ring is connected to the clutch sleeve and supported within the housing to be axially slidable and rotationally fixed relative to the housing. An actuator ring is disposed adjacent to the drive ring, supported for rotation within the housing, and axially fixed relative to the housing. The driver ring moves the clutch sleeve between engaged and disengaged positions.

20 Claims, 7 Drawing Sheets

WHEEL DISCONNECT CLUTCH

TECHNICAL FIELD

The present disclosure relates to wheel disconnect clutches configured to disconnect a wheel hub from a half shaft.

BACKGROUND

Automotive vehicles include a powertrain for propelling the vehicle. A conventional powertrain includes an engine coupled with a transmission. The driveshaft connects and output shaft of the transmission to a differential. The differential receives power and routes it to left and right driven wheels. The differential is connected to the wheels by a pair of halfshafts. Each of the halfshafts splines to a wheel-hub assembly that includes a wheel bearing supported within a knuckle connected to the vehicle suspension. The wheel-hub assembly includes a mounting plate with lugs configured to connect with the wheels. In this arrangement, the driven wheels are always connected to the powertrain.

Some vehicles include an all-wheel-drive system in which a primary drive axle is powered by a primary actuator and a secondary drive axle that is powered by a secondary actuator. The secondary actuator may be deenergized when not needed for vehicle propulsion, however, the actuator and other components of the secondary drive may continue to rotate creating spinning losses.

SUMMARY

According to one embodiment, a wheel disconnect clutch includes a housing attachable to a knuckle and a clutch sleeve slidably supported for axial movement within the housing and having first teeth configured to couple with a wheel hub and second teeth configured to couple with a half shaft. The clutch sleeve is slidable between an engaged position in which the first teeth are coupled to the wheel hub and a disengaged position in which the first teeth are decoupled from the wheel hub. A drive ring is connected to the clutch sleeve and supported within the housing to be axially slidable and rotationally fixed relative to the housing. An actuator ring is disposed adjacent to the drive ring, supported for rotation within the housing, and axially fixed relative to the housing. Rotation of the actuator ring in a first direction slides the drive ring away from the actuator ring to move the clutch sleeve to the engaged position, and rotation of the of actuator ring in a second direction allows the drive ring to slide towards the actuator ring allowing the clutch sleeve to move to the disengaged position.

According to another embodiment, a wheel disconnect clutch includes a clutch sleeve slidably supported for axial movement between an engaged position in which the clutch sleeve couples a wheel hub to a half shaft and a disengaged position in which the wheel hub is de-coupled from the half shaft. an actuator ring is rotatable relative to the clutch sleeve and has a radial face defining a first circumferential ramped surface. A drive ring is axially fixed relative to the clutch sleeve and axially movable relative to the actuator ring. The drive ring having a radial face defining a second circumferential ramped surface, wherein the first and second ramped surfaces are slidably engaged such that rotation of the actuator ring in a first direction urges axial movement of the drive ring away from the actuator ring to slide the clutch sleeve to the engaged position.

According to another embodiment, a wheel assembly includes a knuckle, a wheel hub supported for rotation by the knuckle, a half shaft supported by the wheel hub, and a clutch assembly that selectively engages and disengages the wheel hub and the half shaft. The clutch assembly includes a clutch sleeve rotationally fixed to one of the wheel hub and the half shaft and selectively rotationally fixed to the other of the wheel hub and the half shaft when the clutch assembly is engaged. An actuator ring is operably coupled to the clutch sleeve such that rotation of the actuator ring in a first direction slides the clutch sleeve into engagement with the other of the wheel hub and the half shaft to engage the clutch assembly and such that that rotation of the actuator ring in a second direction allows the clutch sleeve to disengage with the other of the wheel hub and the half shaft to disengage the clutch assembly.

DETAILED DESCRIPTION

Figure 1:
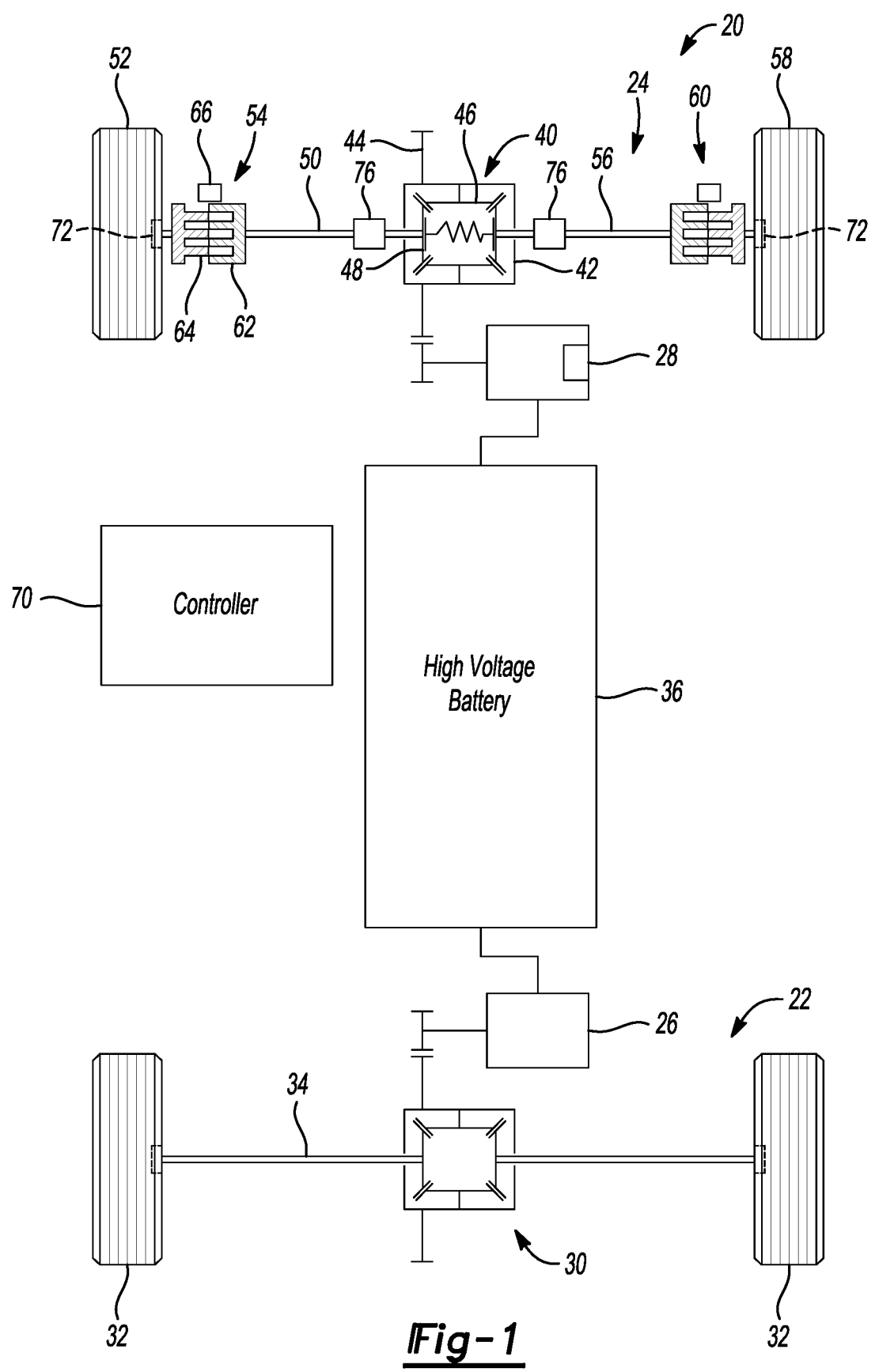
FIG. 1 is a schematic diagram of an electric vehicle having primary and secondary drive axles.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis or centerline is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, coupled, attached, etc., refer to directly or indirectly connected, coupled, attached, etc., unless otherwise indicated explicitly or by context.

Referring to FIG. 1, an electrified vehicle 20 is illustrated according to an embodiment of the present disclosure. FIG. 1 illustrates representative relationships among the components. Physical placement and orientation of the components within the vehicle may vary. The vehicle 20 may be all-wheel drive and include a primary drive axle 22 and a secondary drive axle 24. The primary drive axle 22 may be the rear axle and the secondary drive axle 24 may be the front axle, or vice versa. The primary drive axle 22 is powered by a primary actuator 26, and the secondary axle 24 is powered by a secondary actuator 28. Example actuators include an internal-combustion engine and an electric motor. The motor may be implemented by a plurality of different types of electric machines. For example, the motor may be an alternating current, permanent magnet synchronous machine. The motor may be configured to operate as a motor to propel the vehicle and to operate as a generator to recapture energy such as during regenerative braking. In the illustrated configuration, both of the primary and secondary actuators 26, 28 are electric motors. In other embodiments, the primary actuator 26 may be an internal-combustion engine and the secondary actuator 28 may be a motor or vice versa. The motors 26, 28 are electrically connected to a high-voltage battery 36. Power electronics (not shown) condition direct current (DC) power provided by the battery 36 to the requirements of the motor 28. For example, the power electronics may provide three-phase AC to the motors. The power electronics are also configured to convert AC power generated by the motors to DC power to recharge the battery 36 such as during regenerative braking.

The primary motor 26 may be coupled to a differential 30. The differential 30 routes torque produced by the motor 26 to the driven wheels 32 via halfshafts 34. (Used herein "halfshaft" refers to any type of shaft that connects driven wheels to a drivetrain.) The differential 30 is configured to allow speed differences between the driven wheels to facilitate cornering of the vehicle. The differential 30 may be an open differential or a limited slip-differential.

Secondary axle 24 also includes a differential 40. The differential 40 includes a carrier 42 drivably connected to the secondary actuator 28 via gearing 44. The carrier 42 supports a pair of opposing spider gears 46 and a pair of opposing side gears 48 that mesh with the spider gears 46. Left and right halfshafts 50, 56 are connected to associated ones of the side gears 48. Used herein, "left" and "right" are from the vantage point of the driver seat looking forward. For example, the halfshafts may be splined to the side gears. The left half shaft 50 is connected to the left wheel 52 by a left disconnect clutch 54, and the right half shaft 56 is connected to the right wheel 58 by a right disconnect clutch 60. The disconnect clutches 54, 60 are disengageable to decouple the secondary axle 24 from the road when the secondary actuator 28 is not being used. This reduces spinning losses and can improve electric range and the like. The below figures and related text describe example embodiments of the clutches 54 and 60.

Figure 2:
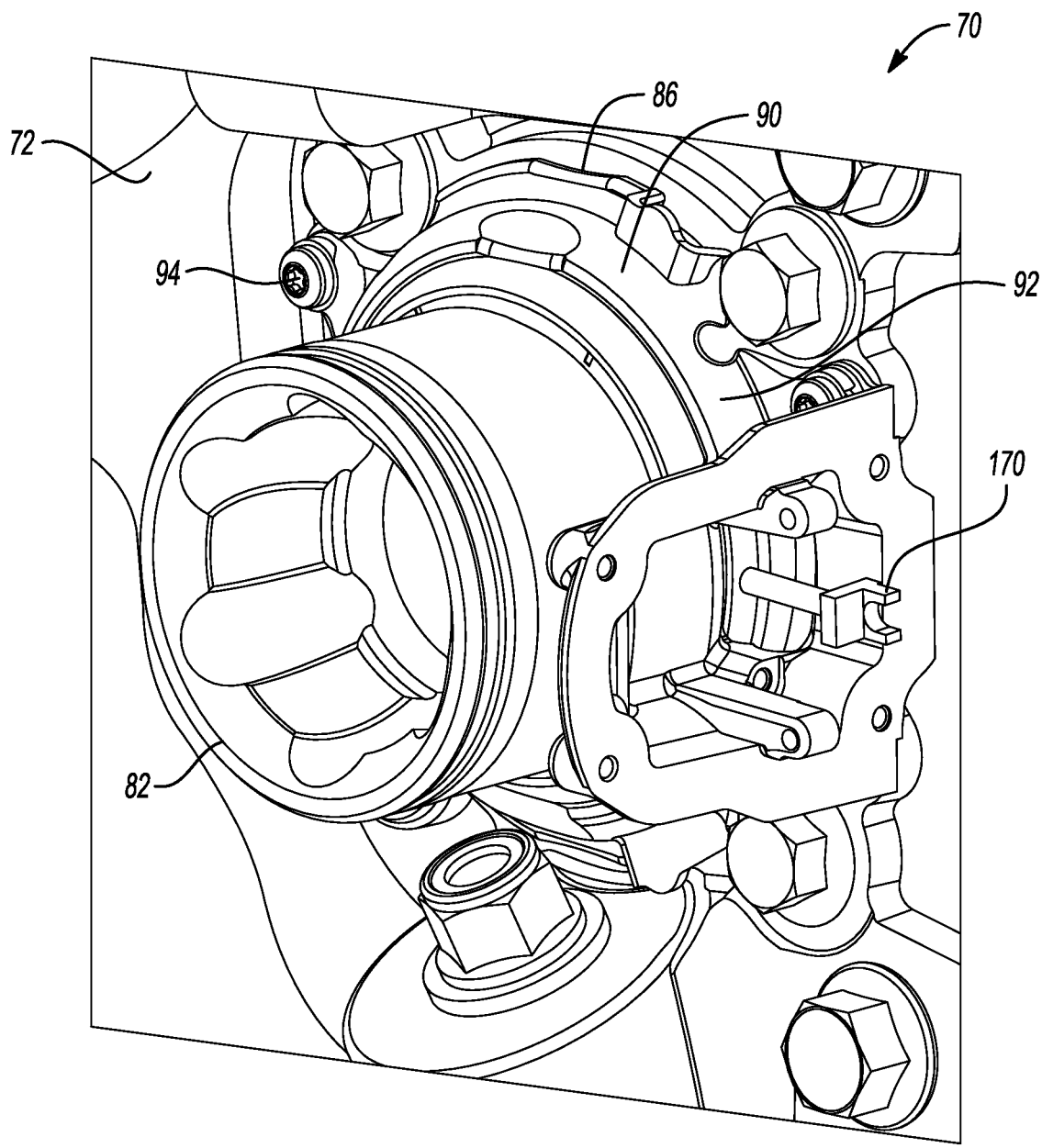
FIG. 2 is a perspective view of a backside of a wheel assembly.
Figure 3A:
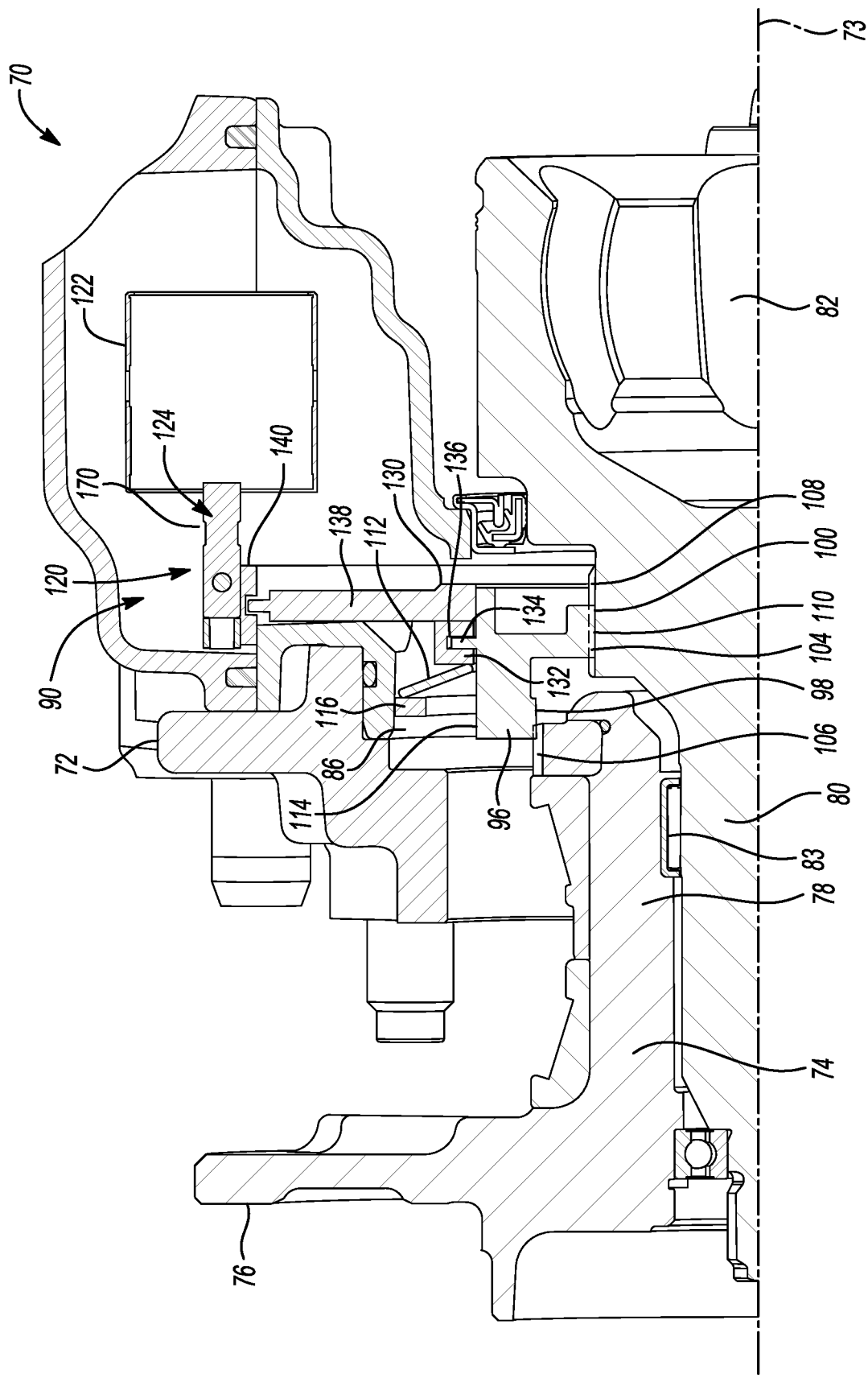
FIG. 3A is a cross-sectional perspective view of the wheel assembly with the wheel disconnect clutch engaged.
Figure 3B:
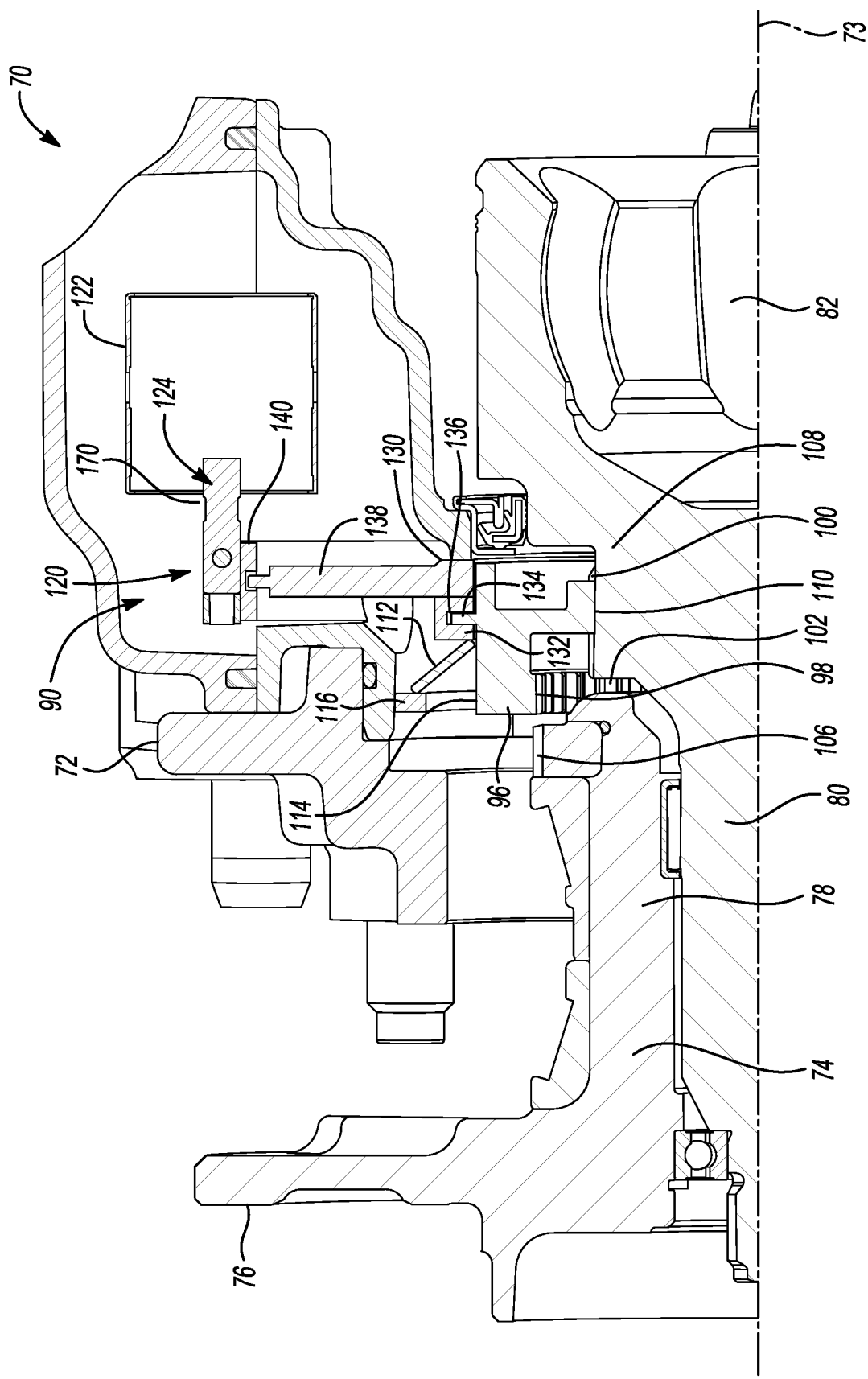
FIG. 3B is a cross-sectional perspective view of the wheel assembly with the wheel disconnect clutch disengaged.

Referring to FIGS. 2, 3A, and 3B, a wheel assembly 70 includes a knuckle 72 that is attached to the vehicle suspension system and sometimes connected to the vehicle steering system if the knuckle is for the front wheels. A wheel hub 74 is supported for rotation by the knuckle 72 about a central axis (centerline) 73. The wheel hub 74 includes a mounting plate 76 configured to connect to the wheel and a shaft portion 78 that is supported within the knuckle 72 by a wheel bearing (not shown). The knuckle 72 defines a hole 86 allowing a halfshaft shaft 82 to extend therethrough and connect with wheel hub 74. The shaft portion 78 is hollow and receives an end portion 80 of the halfshaft 82. A bearing 83 or other friction reducing element may be interposed between the shaft portion 78 and the halfshaft 82 to permit independent rotation between these components when the disconnect clutch is disengaged.

A wheel disconnect clutch 90 is configured to selectively couple the halfshaft 82 to the wheel of 74 so that power produced by the powertrain is provided to the driven wheel when the clutch is engaged and to isolate the powertrain from the driven wheel when the clutch is disengaged. The disconnect clutch 90 includes a housing 92 that is at least partially received within the hole 86 and mounted to the knuckle 72 such as by fasteners 94 or the like. Supported within the housing is a clutch sleeve 96 configured to connect the halfshaft 82 to the wheel hub 74. The clutch sleeve 96 may be slidable within the housing 92 to move between an engaged position (FIG. 3A) in which the clutch sleeve 96 is rotationally fixed to the halfshaft 82 and the wheel hub 74 and a disengaged position (FIG. 3B) in which the clutch sleeve 96 is disconnected from at least one of the halfshaft 82 and the wheel hub 74.

In the illustrated embodiment, the clutch sleeve 96 is hollow and has a first inner circumferential surface 98 having first teeth 102 and a second inner circumferential surface 100 having second teeth 104. The diameter of the surface 98 may be larger than the diameter of the surface 100. The first teeth 102 are configured to engage with teeth 106 defined on an outer surface of the shaft portion 78. The second teeth 104 are configured to engage with teeth 108 defined on an outer circumferential surface 110 of the halfshaft 82. The teeth may be internal and external spline teeth for example that allow axial movement while restraining rotational movement. The clutch sleeve 96 may be continuously engaged with one of the wheel hub 74 and the halfshaft 82 and selectively engaged with the other of the wheel hub 74 and the halfshaft 82. In the illustrated embodiment, the first teeth 102 continuously mesh with the teeth 108 of the halfshaft 82. The sleeve 96 is configured to axially slide along these teeth to selectively engage with the wheel hub 74 to engage the disconnect clutch 90. The disconnect clutch 90 may be biased to the engaged or disengaged position.

In the illustrated embodiment, the clutch 90 is biased to the disengaged position by a resilient member 112 configured to urge the clutch sleeve 96 towards the halfshaft 82 so that the teeth 102 and 106 are disengaged. The resilient member 112 may be an annular spring such as a wave spring or a diaphragm spring. The resilient member 112 may also be a one or more coil or leaf springs, which may be arranged in a an annular pack, a single helical spring around the half shaft, or a compliant plastic material formed in an annulus or as an array of small cylinders such as urethane. The resilient member may also be placed between the rod 124 and the static housing or rod 124 and the exterior of the actuator 122 housing. The resilient member 112 may also be placed within the cam plate 140 and contacting actuator arm 138 and slot end 180. The resilient member 112 may be hollow and seated on the outer circumferential surface 114 of the sleeve 96. The resilient member 112 may be retained within the housing 92 by a snap ring 116 or other feature.

Figure 4:
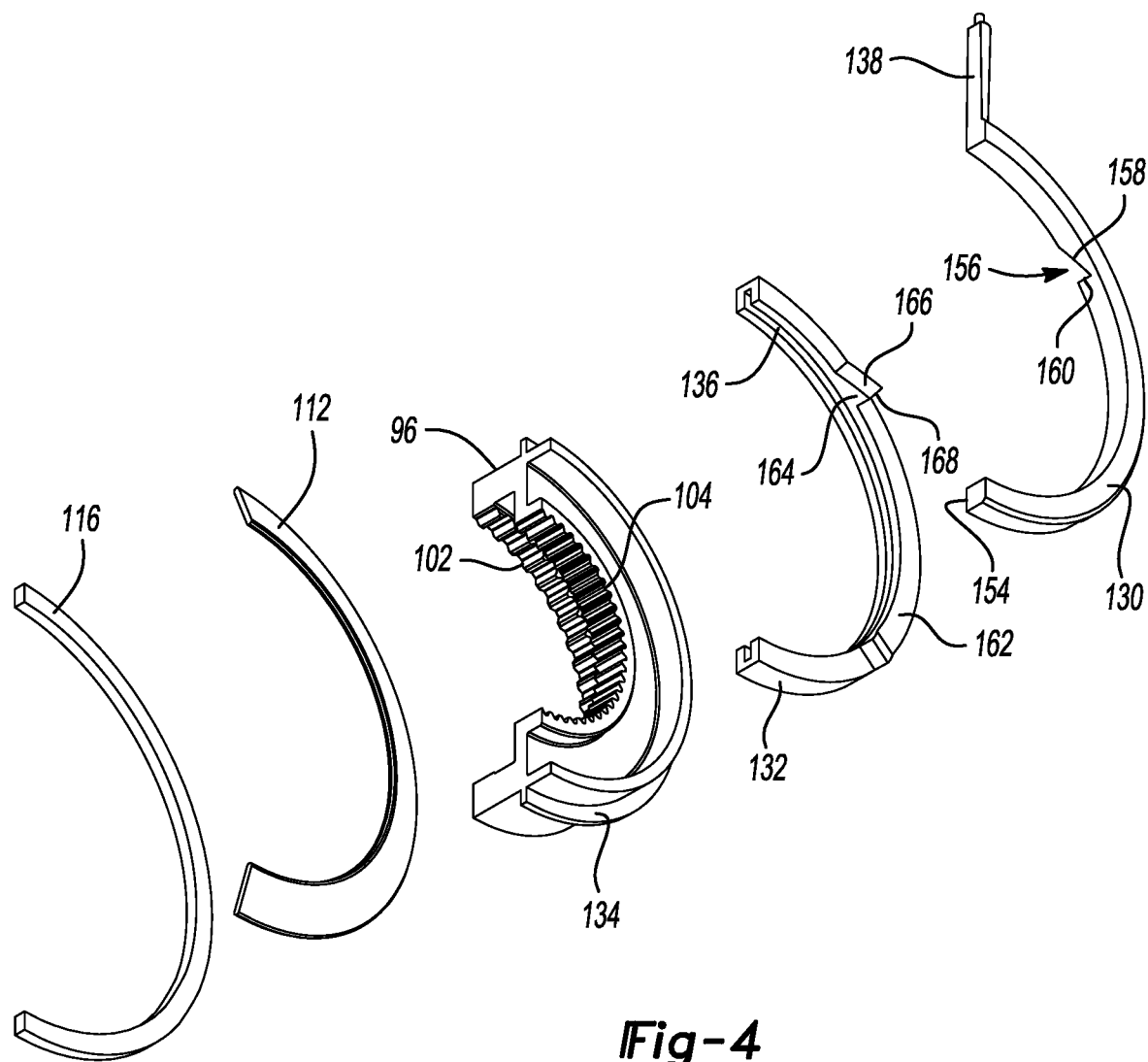
FIG. 4 is a partial exploded cross-sectional view of the wheel disconnect clutch.

Referring to FIGS. 3A, 3B, and 4, an actuator arrangement 120 is configured to engage and disengage the disconnect clutch 90. The actuator arrangement 120 includes an actuator 122 that is operably coupled to the clutch sleeve 96. The actuator 122 may be a linear actuator, such as a solenoid, that is electronically controlled. The actuator 122 may include a rod 124 (an armature) and an electromagnetic coil (not shown) configured to axially move the rod 124 to engage and disengage the clutch 90. The actuator 122 may be a latching solenoid that is configured to hold the rod 124 in the extended position without requiring continuous power at the coil. One type of latching solenoid uses a permanent magnet to hold the rod 124 in the extended position when the coil is deenergized.

The actuator 122 is connected to a drive mechanism within the housing 92 of the clutch 90. In one or more embodiments, the drive mechanism includes an actuator ring 130 and a drive ring 132. The rings 130, 132 may include hollow centers seated on the outer surface 114. The sleeve 96 and the rings 130, 132 may be concentric and supported about the centerline 73 of the wheel assembly 70. The drive ring 132 is coupled to the clutch sleeve 96. For example, the clutch sleeve 96 may define a collar 134 that is received within a groove 136 defined in the inner diameter of the ring 132. The drive ring 132 may be rotationally constrained within the housing 92. A radial face of the drive ring 132 may engage with the resilient member 112 to bias the clutch sleeve 96 to the disengaged position. In alternative embodiments, the drive ring 132 may be integrally formed with the sleeve 96. The actuator ring 130 is disposed in the housing 90 adjacent to the drive ring 132. The actuator ring 130 is axially constrained but rotatable within the housing 90. The actuator ring 130 is connected to the rod 124. For example, the actuator ring 130 may include a clocking pin 138 that extends radially outward from an outer diameter of the ring 130. A cam plate 140 interconnects the clocking pin 138 to the rod 124. As will be described in more detail below, the cam plate 140 is configured to translate the linear movement of the rod 124 (in the axial direction) to a rotational movement used to rotate the actuator ring 130 within the housing 92. The drive ring 132 and the actuator ring 130 include cooperating features that are configured to urge the rings apart in response to rotation of the actuator ring 130 in a first direction and to move together due to the force of the resilient member 112 when the ring 130 is rotated in a second direction. The clutch 90 may be engaged by extending the rod 124 towards the wheel hub 74 causing the actuator ring 130 to rotate and push the drive ring 132 thus sliding the clutch sleeve 96 into engagement with wheel hub 74.

Figure 5B:
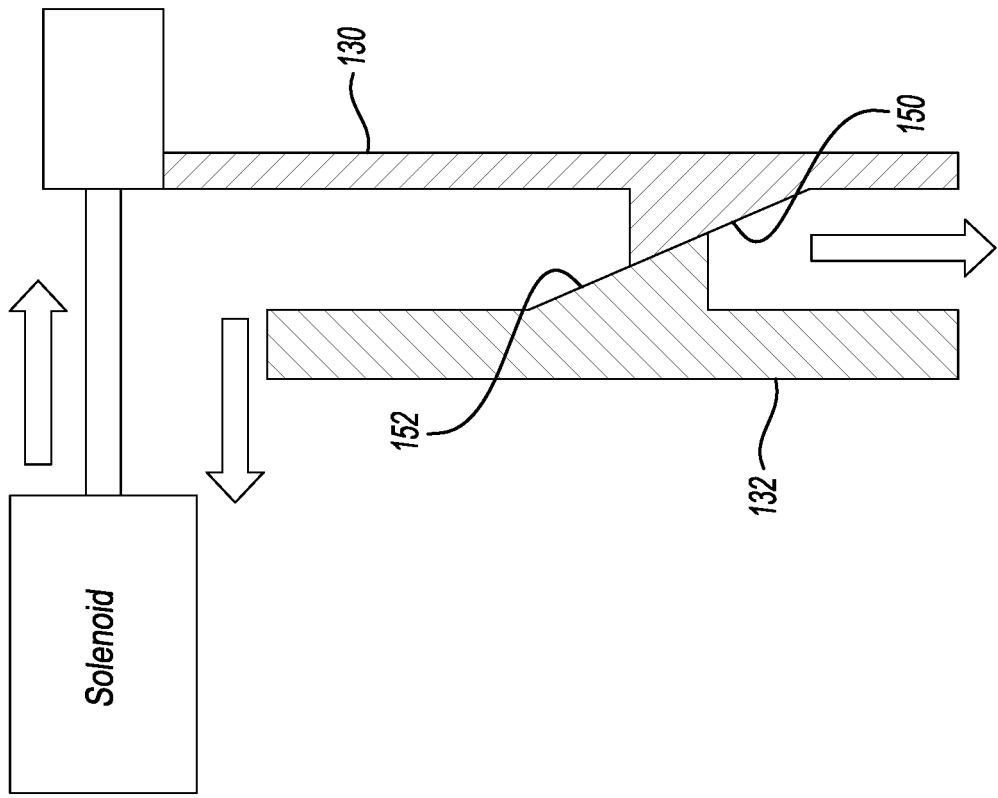
FIGS. 5A and 5B are schematic diagrams illustrating one embodiment of a mechanism for engaging and disengaging the wheel disconnect clutch.
Figure 5A:
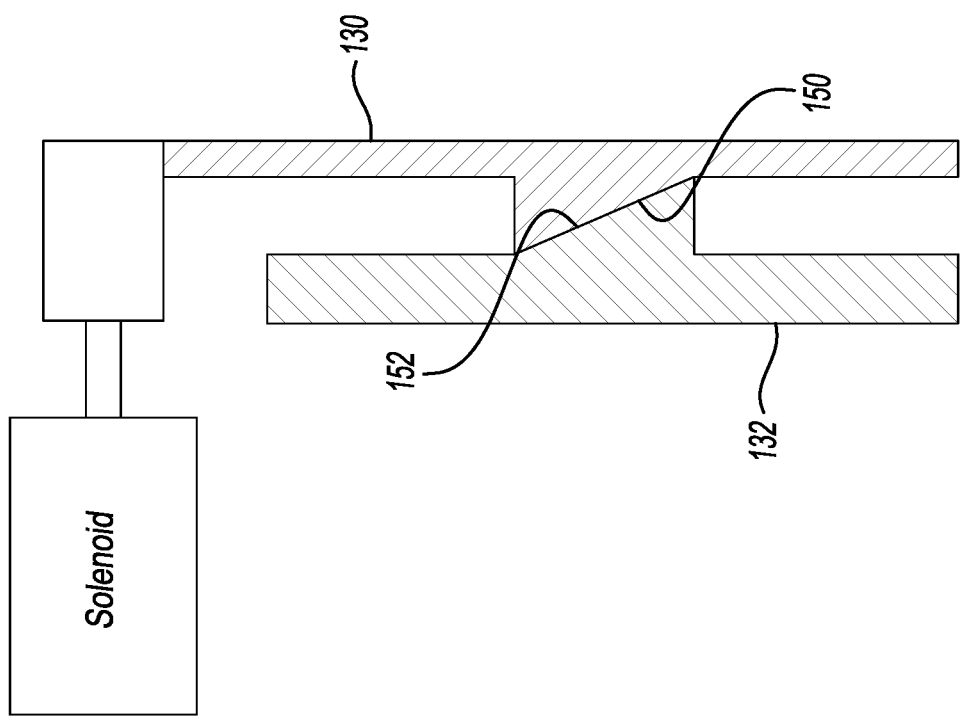

Referring to FIGS. 5A and 5B, the features on the rings may be any features configured to convert rotational movement of one of the rings into axial movement of the other of the rings. In one or more embodiments, the features are cooperating ramped surfaces that ride up each other in response to rotation to create axial separation. For example, the actuator ring 130 may include one or more ramped surfaces 150 that engage with one or more ramped surfaces 152 of the drive ring 132. The ramps surfaces 150 and 152 are inclined at opposite angles, which may have a same magnitude, so that the ramped surfaces nest with each other in a first rotational position (FIG. 5A) of the actuator ring 130 and ride up each other in a second rotational position of the actuator ring 130 (FIG. 5B) to engage the clutch 90.

Referring to FIG. 4, the ramped surfaces may be provided as part of a cam or as part of a recess. In the illustrated embodiment, the actuator ring 130 has a first radial face 154 defining a plurality of recesses 156. Each of the recesses 156 may include a declined ramped surface 158 that extends axially inboard from the radial face 154 and extends circumferentially around the face 154. The declined ramped surface 158 increases in depth from the face 154 in a circumferential direction of the actuator ring 130. Each of the recesses 156 may also include an axially extending wall 160 that is joined to the deepest point of the ramped surface 158.

The drive ring 132 has a face 162 that defines a plurality of cams (projections) 164 that may match in shape and size with the recesses 156 so that the cams 164 are receivable within the recesses 156. Each of the cams 164 may include an inclined ramped surface 166 that projects axially outward from the face 162 and extends circumferentially around the face 162. The inclined ramped surface 166 increases in height from the face 162 in a circumferential direction of the drive ring 132. Each of the cams 164 may also include an axially extending wall 168 that extends between the outermost tip of the inclined ramped surface 166 and the face 162. In an alternative embodiment, the cams may be on the actuator ring 130 and the recesses may be on the drive ring 132. In embodiments without the drive ring, the cams 166 or the recesses 156 may be integrally formed with the clutch sleeve 96.

This application is not necessarily limited to using ramped surfaces for urging the drive ring 132 away from the actuator ring 130. In an alternative embodiment, a ball-ramp mechanism may be used to convert the rotational movement of the actuator ring 130 into axial movement of the drive ring 132. Here, the actuator ring 130 and the drive ring 132 may define variable-depth pockets that are recessed into the faces 154 and 162, respectively. A plurality of balls are disposed within these pockets and are configured to ride on angled faces of the pockets such that relative rotation between the rings in a first direction causes the balls to ride out of the pockets and urge the rings apart, and relative rotation between the rings in a second direction causes the balls to ride into the pockets allowing the rings to come together.

Figure 6B:
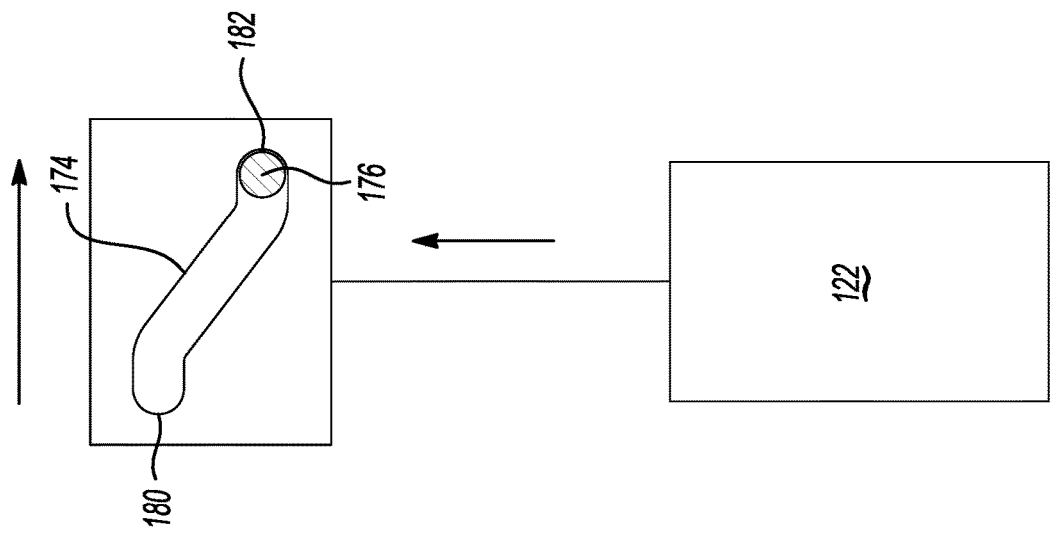
FIGS. 6A and 6B are schematic diagrams illustrating one embodiment of a cam plate of an actuator arrangement.
Figure 6A:
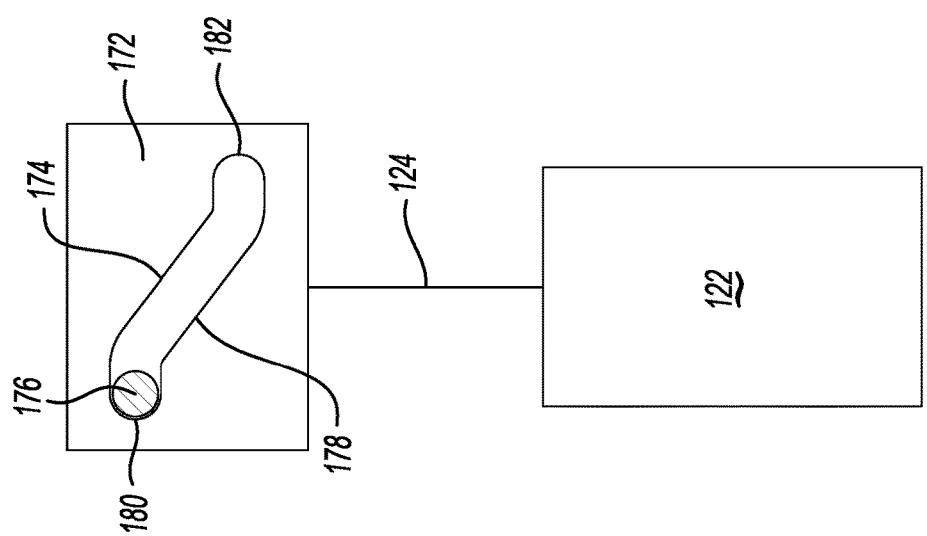

Referring to FIGS. 3, 6A, and 6B, as described above, the cam plate 140 is used to convert linear movement of the actuator 122 into rotation movement of the actuator ring 130. The cam plate 140 may include fork 170 connected to the rod 124. The plate 140 defines a slot 174 that receives a tip 176 of the clocking pin 138. The slot 174 is oblique relative to the axial direction of the assembly so that linear, axial movement of the rod 124 rotates the actuator ring 130. The slot 174 may include a middle portion 178 that is angled and a pair of end portions 180, 182 that are perpendicular to the axial direction. FIG. 6A shows the rod 124 in a retracted position that results in the tip 176 being disposed in the end 180 of slot. This position corresponds with the clutch 90 being disengaged. To engage the clutch 90, the rod 124 is extended. The angled orientation of the middle portion 178 creates a component force, in the circumferential direction, on the clocking pin 138 urging the actuator ring 130 to rotate as the tip 176 moves from the end 180 to the end 182. The clutch 90 is disengaged by retracting the rod 124 causing the tip 176 to move from the end 182 to the end 180, which rotates the actuator ring 130 and allows retraction of the clutch sleeve 96 by the biasing member.

The actuator arrangement is not limited to a linear actuator that is oriented in the axial direction. In an alternative embodiment, a linear actuator may be oriented to extend in the circumferential direction. In this instance, the cam plate may not be necessary and instead the actuator may be directly connected to the clocking pin. The linear actuator could also be oriented radially. A radial orientation would be positioned beside the clocking pin with a ramp moving it and a spring returning it—or a solenoid could push and pull with a ramp on either side. The actuator arrangement may alternatively include a rotary actuator, such as an electric motor, that is drivably connected to the actuator ring and configured to rotate the actuator ring.

The clutch is able to engage and disengage very quickly, e.g., 75 milliseconds, which allows the disconnect clutch to be used in a vehicle that actively deenergizes the secondary axle to improve fuel economy when driver-demanded torque is low. When driver-demanded torque increases, the disconnect clutch is able to seamlessly reconnect the secondary axle and apply torque using the secondary actuator in a manner that is undetectable to the driver due to the extremely fast actuation time of the disconnect clutch. Using a solenoid as the prime mover enables this fast actuation of the clutch unlike an electric motor that is unable to provide clutch-actuation speeds in the milliseconds. The all electric system of the disconnect clutch results in a compact package that does not require any clunky hydraulic system. The system is also very energy efficient and is able to perform actuation with less than 0.001 Watt/Hour energy consumption per shift.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A wheel disconnect clutch comprising:
a housing attachable to a knuckle;
a clutch sleeve slidably supported for axial movement within the housing and including first teeth configured to couple with a wheel hub and second teeth configured to couple with a half shaft, wherein the clutch sleeve is slidable between an engaged position in which the first teeth are coupled to the wheel hub and a disengaged position in which the first teeth are decoupled from the wheel hub;
a drive ring connected to the clutch sleeve and supported within the housing to be axially slidable and rotationally fixed relative to the housing; and
an actuator ring disposed adjacent to the drive ring, supported for rotation within the housing, and axially fixed relative to the housing, wherein rotation of the actuator ring in a first direction slides the drive ring away from the actuator ring to move the clutch sleeve to the engaged position, and rotation of the of actuator ring in a second direction allows the drive ring to slide towards the actuator ring allowing the clutch sleeve to move to the disengaged position.

2. The wheel disconnect clutch of claim 1, wherein the drive ring includes first features and the actuator ring includes second features configured to engage with the first features to create repulsive force in response to rotation of the actuator ring in the first direction.

3. The wheel disconnect clutch of claim 2, wherein the first features are one of cams and cutouts and the second features are the other of the cams and cutouts.

4. The wheel disconnect clutch of claim 3, wherein the cams are shaped to be receivable within the cutouts, and wherein the cams and cutouts are shaped such that rotation of the actuator in the first direction urges the cams out of the cutouts and rotation of the actuator in the second direction allows the cams to be received in the cutouts.

5. The wheel disconnect clutch of claim 3, wherein each of the cams includes an inclined ramped surface and each of the cutouts defines a declined ramp surface, wherein the inclined and declined ramped surfaces cooperate to urge the drive ring and the actuator ring apart in response to rotation of the actuator ring in the first direction.

6. The wheel disconnect clutch of claim 1, wherein the drive ring has a first radially extending face defining a raised cam having an inclined ramped surface that increases in height from the first face in a circumferential direction of the drive ring, and the actuator ring has a second radially extending face defining a cutout having a declined ramped surface the increases in depth from the second face in the circumferential direction, wherein the cam is received within the cutout with the inclined surface in contact with the declined surface such that rotation of the actuator in the first direction ring causes the inclined and declined surfaces to ride up each other to urge the drive ring and the actuator ring apart.

7. The wheel disconnect clutch of claim 6, wherein the cam is a plurality of cams and the cutout is a plurality of cutouts.

8. The wheel disconnect clutch of claim 1, wherein the actuator ring has a first radially extending face defining a raised cam having an inclined ramped surface that increases in height from the first face in a circumferential direction of the actuator ring, and the drive ring has a second radially extending face defining a cutout having a declined ramped surface the increases in depth from the second face in the circumferential direction, wherein the cam is received within the cutout with the inclined surface in contact with the declined surface such that rotation of the actuator ring in the first direction causes the inclined and declined surfaces to ride up each other to urge the drive ring and the actuator ring apart.

9. The wheel disconnect clutch of claim 1, wherein the clutch sleeve defines a radially extending collar, and the drive ring has an inner circumferential surface defining a groove that receives the collar to connect the clutch sleeve and the drive ring.

10. The wheel disconnect clutch of claim 1, wherein the drive ring and the actuator ring circumscribe the clutch sleeve.

11. The wheel disconnect clutch of claim 1, wherein the first teeth are formed on a first inner circumferential surface of the clutch sleeve, and the second teeth are formed on a second inner circumferential surface of the clutch sleeve, wherein the first circumferential surface has a lager diameter than the second circumferential surface.

12. The wheel disconnect clutch of claim 1 further comprising a resilient member biasing the drive ring towards to the actuator ring.

13. The wheel disconnect clutch of claim 1 further comprising a linear actuator having an extendable rod that is axially oriented, wherein the rod is connected to a radially extending clocking pin of the actuator ring by a cam plate, wherein the cam plate is configured to translate the axial movement of the rod into rotation of the actuator ring.

14. The wheel disconnect clutch of claim 13, wherein the cam plate defines a slot that receives a tip of the clocking pin therein, the slot is oriented obliquely so that extension of the rod rotates the actuator ring in the first direction to engage the clutch sleeve and retraction of the rod rotates the actuator ring in the second direction to disengage the clutch sleeve.

15. A wheel disconnect clutch comprising:
 a clutch sleeve slidably supported for axial movement between an engaged position in which the clutch sleeve couples a wheel hub to a half shaft and a disengaged position in which the wheel hub is de-coupled from the half shaft;
 an actuator ring rotatable relative to the clutch sleeve and having a radial face defining a first circumferential ramped surface; and
 a drive ring axially fixed relative to the clutch sleeve and axially movable relative to the actuator ring, the drive ring having a radial face defining a second circumferential ramped surface, wherein the first and second ramped surfaces are slidably engaged such that rotation of the actuator ring in a first direction urges axial movement of the drive ring away from the actuator ring to slide the clutch sleeve to the engaged position.

16. The wheel disconnect clutch of claim 15 further comprising:
 a linear actuator configured to move the clutch sleeve between the engaged and disengaged position, the linear actuator having a reciprocating rod oriented axially; and
 a cam plate connecting a clocking pin of the actuator ring to the rod and configured to translate axial movement of the rod into rotational movement of the actuator ring.

17. The wheel disconnect clutch of claim 15, where the clutch sleeve includes first teeth configured to couple with the wheel hub when the clutch sleeve is in the engaged position and second teeth configured to couple with the half shaft when the clutch sleeve is in both the engaged and disengaged positions.

18. The wheel disconnect clutch of claim 17, wherein the first teeth are formed on a first inner circumferential surface of the clutch sleeve, and the second teeth are formed on a second inner circumferential surface of the clutch sleeve, wherein the first circumferential surface has a lager diameter than the second circumferential surface.

19. The wheel disconnect clutch of claim 15, wherein the first ramped surface is recessed into the radial face of the actuator ring, and the second ramped surface projects from the radial face of the drive ring.

20. A wheel assembly comprising:
 a knuckle;
 a wheel hub supported for rotation by the knuckle;
 a half shaft supported by the wheel hub; and
 a clutch assembly that selectively engages and disengages the wheel hub and the half shaft, the clutch assembly including:
  a clutch sleeve rotationally fixed to one of the wheel hub and the half shaft and selectively rotationally fixed to the other of the wheel hub and the half shaft when the clutch assembly is engaged, and
  an actuator ring operably coupled to the clutch sleeve such that rotation of the actuator ring in a first direction slides the clutch sleeve into engagement with the other of the wheel hub and the half shaft to engage the clutch assembly and such that that rotation of the actuator ring in a second direction allows the clutch sleeve to disengage with the other of the wheel hub and the half shaft to disengage the clutch assembly.

\* \* \* \* \*